United States Patent

Tuschy et al.

[15] 3,641,858
[45] Feb. 15, 1972

[54] APPARATUS FOR CUTTING PIECES OF PREDETERMINABLE LENGTH

[72] Inventors: Eckhard Osnabrueck Tuschy; Theodor Niggemann, both of Sutthausen, Germany

[73] Assignee: Kabel-und Metallwerke Gutehoffnungshutte Aktiengesellschaft, Hannover, Germany

[22] Filed: Jan. 26, 1970

[21] Appl. No.: 5,669

[30] Foreign Application Priority Data

Jan. 9, 1969 Germany .................... P 19 00 873.2

[52] U.S. Cl. .................................................. 83/337, 83/924
[51] Int. Cl. ................................................................ B26d 1/28
[58] Field of Search ............................................ 83/337, 924

[56] References Cited

UNITED STATES PATENTS

| 2,445,174 | 7/1948 | Hannewald et al. | 83/337 |
| 2,435,660 | 2/1948 | Tileston | 83/924 X |
| 1,306,009 | 6/1919 | Hartman | 83/337 |

FOREIGN PATENTS OR APPLICATIONS

| 241,356 | 4/1910 | Germany | 83/337 |

*Primary Examiner*—William S. Lawson
*Attorney*—Smyth, Roston & Pavitt

[57] ABSTRACT

A device for cutting elongated workpieces is disclosed in which the cutters rotate continuously. The cutters are disposed in discs having grooves for guiding the workpiece. The cutters are actuated through cams and cam followers. When the cutters are in cutting position the cam followers, coupled to the cutters, are in the operating range of the cams, and the latter may cause protraction of the cutters for cutting.

5 Claims, 2 Drawing Figures

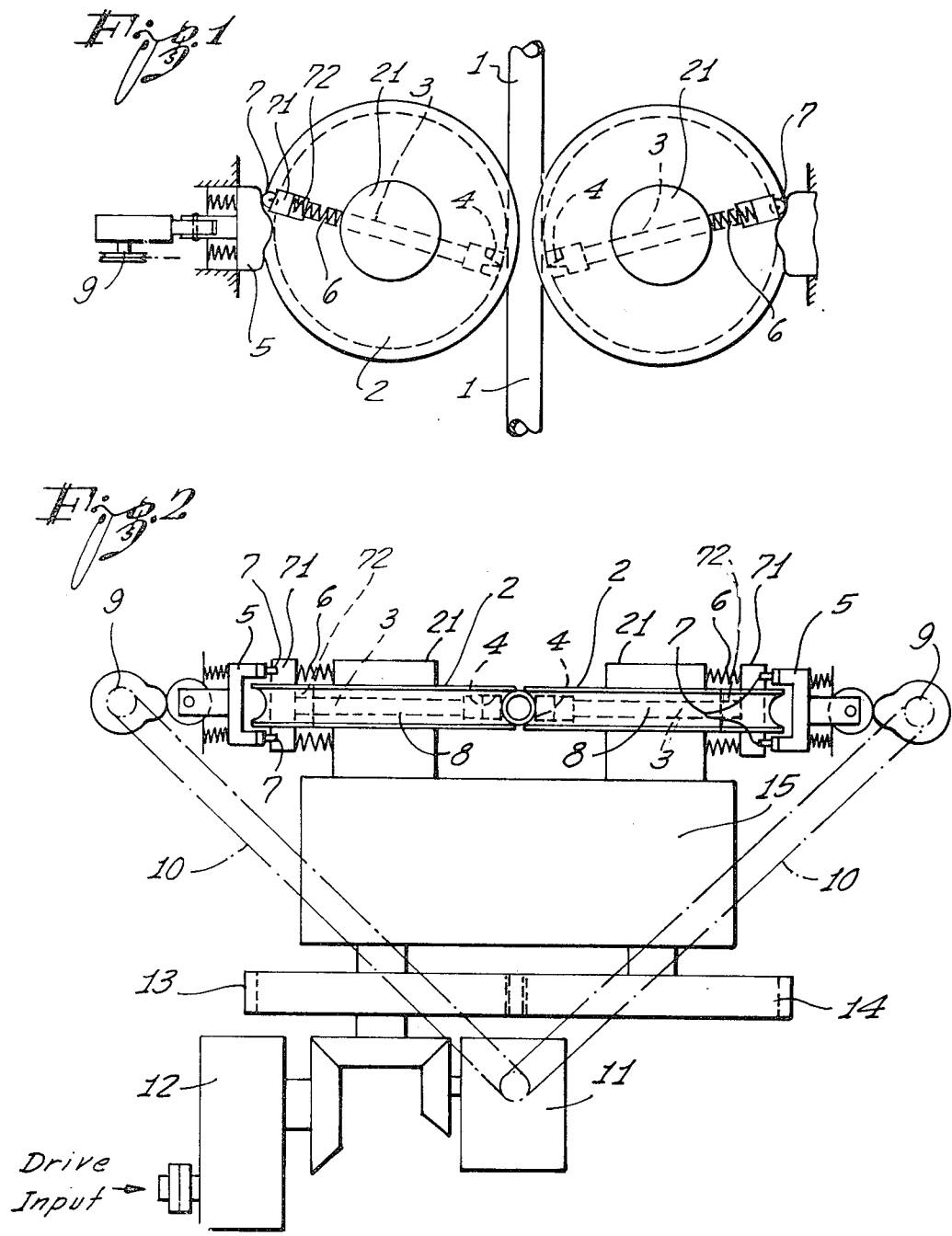

APPARATUS FOR CUTTING PIECES OF PREDETERMINABLE LENGTH

The present invention relates to a device for cutting pieces of definite length from a running rather long and elongated workpiece, for example, an extrusion molded pipe or rod made of aluminum. Elongated workpieces, for example, extruded pipes or rods, or even long, rolled workpieces usually constitute semifinished products, produced at relatively large lengths which would require very long holds for storage. Wherever there is a limited storage space available, or if such semifinished products have to be transported to a different location for further processing, it may be necessary to subdivide these elongated pieces into pieces of shorter lengths.

Usually, one employs stationary circular saws or cutters. The long and elongated workpiece is transported to and/or through this cutting implement, then it is stopped, cut and the cut piece is removed. This type of stop-and-go operation prevents, in many cases, a continuous production and therefore, a recent development has led to movable sawing or cutting implements. The cutter is accelerated from a particular position and in direction of the running workpiece to run with the workpiece so that cutting can now be obtained without having to stop the elongated workpiece. The cutting implement, of course, has to obtain the same speed as the workpiece during cutting thereof. Subsequently, the cutting or sawing implement is retracted, stopped and returned for the next cut.

It is apparent that such device has several disadvantages; the cutting implement or saw is heavy but has to be accelerated during a comparatively short period. The acceleration has to be sufficiently high so that the desired speed, which is the speed of the elongated workpiece, is obtained in shortest possible period of time. Moreover, after cutting the cutter has to be returned to the initial position to begin another cycle. This requires decelerating of the heavy cutter, stopping, return acceleration, deceleration, and stopping again. This back-and-forth motion of the cutter, on the other hand, limits cutting to a not too short minimum size and/or limits the speed with which the elongated workpieces can move, which, in turn, is a limit on economic production.

The difficulties outlined above are overcome by the invention. In accordance with the present invention, the cutting tools rotate in the direction of the elongated workpiece, continuously, and with constant velocity, and cutting is obtained when the cutting tool has angular position to the workpiece permitting cutting without unduly loading the cutting tool. It is, therefore, not necessary to accelerate large masses, particularly during short periods of time. Accordingly, relatively high speed of motion of the elongated workpiece for propagating through and traversal of the cutting station is now permissible. The cutting tools are secured to toolholders so that they can be exchanged rather easily when worn. These holders are preferably provided in radial bores of rotating discs and are freely movable therein in radial direction.

Each of these disc has preferably a groove along its respective outer periphery which has a profile matching the profile of the elongated pieces. The discs face each other across their periphery and define complementary duct portions, and together they establish a duct through which the workpiece to be cut is guided. In other words, the workpiece is guided by the concavely profiled periphery of rotating discs serving as support for cutting tool holders and cutters. Normally, the peripheral speed of the discs where juxtaposed to the workpiece matches or is supposed to match the speed of the latter. The dimensions of the grooves are slightly oversized, particularly in relation to the cross section of the workpieces. This way, incidental sliding between workpiece and discs is avoided, if there happens to occur relative motion between the propagating workpiece and the rotating disc. On the other hand, the facing grooves provide sufficient support for the elongated piece during cutting.

The workpieces are guided before and behind the cutting area to obtain exact position in relation to the disc. The peripheral speed of the discs is almost identical to the speed of the elongated workpiece. The directions, of course, are likewise similar so that there is zero or almost zero relative velocity between cutting tools and moving workpiece. This way, the cutting tools are not unnecessarily loaded.

The discs may be exchangeable and different sets of discs may differ as to the diameter of the discs. Also, they may differ in profile as far as the peripheral groove is concerned, so that differently profiled, elongated workpieces can be cut. Different diameters of the discs of different sets will result in different cutting lengths.

An infinitely variable speed transmission may be included so that the relative speed between disc and elongated workpieces (normally zero) can be adjusted from zero to a finite difference, the maximum speed difference permissible being determined by the strength of the cutters. If there is a relative velocity, within the mechanical limits of the cutting tool, the available cutting length is not necessarily identical with or an integral multiple of the perimeter of the disc, measured along the bottom of the groove.

The cutter holders are moved in radial direction by means of cams which are controlled, e.g., electrically, mechanically or hydraulically. The cams have actuators which do not rotate, and the cutter holders are coupled to actuator followers (a) passing the actuators when the cutters have proper orientation to the workpiece for (b) selective actuation of the followers to cause the cutters to move towards the workpiece. After the cutting, the holders or the cutters themselves are retracted by means of springs into a resting position. Protraction and retraction of cutters and holders are radial movements in the respective discs.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates an elevational view of the salient features of equipment in accordance with the preferred embodiment of the present invention; and FIG. 2 illustrates a rear view of the same equipment, including illustration of additional features.

Proceeding now to the detailed description of the drawings, an elongated workpiece such as a tube or rod 1 passes between two or more discs 2. The two discs are removably placed on shafts 21, secured thereto for rotation therewith as indicated by the arrows. Shafts 21 and, accordingly, discs 2 are disposed with parallel axes, but the discs rotate in a common plane, being almost tangent right at the area where the workpiece 1 passes between them. The discs have peripheral grooves 8, and the two radially facing grooves of the discs define a duct through which the workpiece 1 is guided.

Discs 2 are provided each with a radially extending bore 3 in which are disposed cutting tool holders 3 for supporting the cutting tools 4 in these bores and near the circumference of the discs. During operation discs 2 rotate as indicated by the two arrows, and it is assumed that these discs are being driven at the speed so that the peripheral speed equals or at least approximates the propagation speed of workpiece 1.

Whenever a workpiece is to be cut, a control device actuates U-shaped cams 5. The control device can be mechanical, electrical or hydraulic in nature. A mechanical control system is shown in FIG. 2. Cams 5, when actuated, move radially towards the discs 2 and engage actuate followers which include small wheels 7 mounted in pairs in the respective tool holders 3. The tool holders 3 each has axially projecting arms 71 so that cam actuation occurs above and below the rotating discs. The arms slide in a radial slot 72 communicating with the radial bore. The pair of cams 5 move transverse to the direction of workpiece propagation and essentially colinear to each other but in opposite directions. The cams, of course, move towards each other only when engaging wheels 7. Accordingly, holders and cutting tools move radially in the discs and essentially colinear to each other. Rotation continues but covers only a small angle during cutter protraction. As the cutters engage workpiece 1 they cut same. After cutting cams 5 disengage from wheels 7 and cutters 4 and holders 3 are retracted by cooperation of springs 6 without further actuation by cams 5. Those springs 6 bear against the rotating shafts 21, they are loaded when the cam actuates the holders via wheels 7 and arms 71.

As is more fully illustrated in FIG. 2, the cams 5 have on their driven side feeler wheels 51 which ride on cam wheels 9 for actuation which are driven via a chain 10 by means of a suitable transmission 11. The length of the cut pieces is defined by the peripheral speed of discs 2, which is constant, and by the rotational speed of cam wheel 9. The transmission 11 is assumed to be an adjustable one, so that the speed of wheels 9 can be changed. In the most simple case, cam wheels 9 make one revolution per revolution of discs 2, so that the cutters are actuated each time they face the workpiece. Of course, the length of the pieces cut is for this case equal to the circumference of the discs, as measured along the bottom of a groove, but somewhat thereabove, for a distance equal to the average closest distance of workpiece 1 from the bottom of the groove. Other permissible periods of rotation for cam wheels 9 are integral multiples of the period resulting in one cam actuation for each revolution of discs 2.

It follows that either after each complete revolution of discs 2, or after an integral multiple of revolutions but only when the cutters 4 are about to face each other across the duct through which the workpiece 1 passes, cam wheels 9 respectively actuate cams 5 which, in turn, engage wheels 7 to radially move the holders 3 towards each other, so that the workpiece is cut. Even if the lines of movement of cutters still have a small angle to each other, each faces already, in close approximation, the point of cutting. As the sine of an angle is about equal to the angle for small angles, there is little relative speed between workpiece and the component of motion of the cutters in the same direction of workpiece propagation (unless there is an intentional differential). As the cutters have most protracted position, for example when directly in line with and at shortest distance from each other, cutting is completed. As cam wheel 9 disengages from cams 5, springs retract these cams, and springs 6, in turn, retract holders with cutters. As was mentioned above, the cams 5 can be moved electrically, e.g., by means of a solenoids or hydraulically by or pneumatically by means of suitably operated pistons.

The transmission 11 is now shown to be driven by an infinitely variable transmission 12, which also drives discs 2 via gear wheels 13 and 14. It is, of course, important that the two discs 2 have precisely the same speed, even through that speed may differ slightly from the propagating speed of workpiece 1. Of course, it is also to be observed that the two wheels 2 have opposite senses of rotation. It can readily be seen, that in case workpiece 1 has speed different from the circumferential speed of discs 2, the cutting length is not an integral multiple of the circumference of discs 2. As discs 2 are removable, differently large discs can be placed on shafts 21, so that, in fact, there is great variety in cutting length. For different size discs (2), shafts 21 must have different distance from each other accordingly. Thus, gear box 15 may include pivotable arms for support of these shafts 21.

In cases, the cross section of the elongated workpieces is rather large, so that it may be of advantage to have more than two discs with cutters, e.g., three or more discs can be disposed around the circumference of the elongated workpiece 1, preferably at equal angles between these and in relation to the axis defined by the cylindrical workpiece 1.

The invention is not limited to the embodiments described above but all changes and modifications thereof not constituting departures from the spirit and scope of the invention are intended to be included.

We claim:

1. Apparatus for cutting pieces of predeterminable length from a moving elongated workpiece, such as tubes, pipes or rods, comprising:
a pair of rotating discs peripherally juxtapositioned to each other and to the elongated work piece, each disc having a peripheral groove, the grooves of the disc facing each other at a particular location and receiving the work piece thereat,
each disc provided with a radial bore, the bores passing through a colinear position of mutual alignment at said location during rotation of the discs;
a pair of cutters each with cutter holder and being displaceably disposed respectively in the bores; and
operating means normally retracting the cutters into the bores, but advancing the cutters towards each other when the bores approach the alignment position, and having maximum protracted position in the alignment position for completely cutting the elongated work piece from opposite sides when passing said location.

2. Device as in claim 1, the discs being removably disposed for selection of different size discs.

3. Device as in claim 1, and the operating means including actuator means and actuator follower means for controlled engagement by the actuator means, the actuator following means coupled to the cutter holders for obtaining workpiece cutting when the actuator follower means are actuated by the actuator means, and control means for operating the actuator means in phase relation to the rotation to the rotation of the rotating cutters.

4. Device as in claim 3 there being spring means to retract the follower means and cutters after cutting.

5. Device as in claim 1, the discs have circumferential speed having speed difference relative to the workpiece speed below a predetermined minimum.

* * * * *